(12) United States Patent
Goold et al.

(10) Patent No.: US 9,188,189 B2
(45) Date of Patent: Nov. 17, 2015

(54) ISOLATORS INCLUDING MAGNETICALLY-ASSISTED THERMAL COMPENSATION DEVICES

(71) Applicant: HONEYWELL INTERNATIONAL INC., Morristown, NJ (US)

(72) Inventors: Ryan Goold, Glendale, AZ (US); Ben Smith, Glendale, AZ (US); Paul Buchele, Glendale, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 218 days.

(21) Appl. No.: 13/921,483

(22) Filed: Jun. 19, 2013

(65) Prior Publication Data

US 2014/0374974 A1     Dec. 25, 2014

(51) Int. Cl.
  *F16F 13/00* (2006.01)
  *F16F 9/52* (2006.01)
  *F16F 15/03* (2006.01)

(52) U.S. Cl.
  CPC . *F16F 9/52* (2013.01); *F16F 13/00* (2013.01); *F16F 15/03* (2013.01)

(58) Field of Classification Search
  CPC ..... F16F 15/03; F16F 2230/105; F16F 13/00; F16F 13/06; F16F 13/26
  See application file for complete search history.

(56) References Cited

U.S. PATENT DOCUMENTS

| | | | |
|---|---|---|---|
| 5,704,596 A | 1/1998 | Smith et al. | |
| 5,947,457 A * | 9/1999 | Swanson et al. | 267/140.14 |
| 5,957,440 A * | 9/1999 | Jones et al. | 267/140.14 |
| 6,325,365 B1 | 12/2001 | Fujita et al. | |
| 6,386,343 B1 | 5/2002 | Robinson et al. | |
| 6,505,718 B2 | 1/2003 | Fujita et al. | |
| 6,588,554 B2 | 7/2003 | Fujita et al. | |
| 6,896,109 B2 | 5/2005 | Kelso et al. | |
| 6,938,889 B2 | 9/2005 | Chuang | |
| 8,322,498 B2 | 12/2012 | Chen | |
| 2003/0051954 A1 | 3/2003 | Sendrea | |
| 2004/0134732 A1 | 7/2004 | Mintgen et al. | |
| 2004/0195061 A1 * | 10/2004 | Kelso et al. | 188/267 |

(Continued)

OTHER PUBLICATIONS

EP Search Report for Application No. 14171422.0 dated Oct. 8, 2014.

(Continued)

*Primary Examiner* — Vishal Sahni (74) *Attorney, Agent, or Firm* — Ingrassia Fisher & Lorenz, P.C.

(57) ABSTRACT

Embodiments of isolators including magnetically-assisted thermal compensation devices are provided, as are embodiments of magnetically-assisted thermal compensation devices. In one embodiment, the isolator includes a damper assembly and a magnetically-assisted thermal compensator ("TC"). The magnetically-assisted TC includes, in turn, a TC chamber fluidly coupled to the damper assembly and configured to exchange damping fluid therewith. A TC piston is slidably disposed within the TC chamber and exposed to damping fluid when the TC chamber is filled therewith. A TC bellows is sealingly coupled to the TC piston and exerts a resilient bias force thereon. A magnetic preload system is further coupled to the TC piston and exerts a magnetic bias force thereon, which combines with the resilient bias force provided by the TC bellows to impart the magnetically-assisted TC with a predetermined pressure profile over the operative temperature range of the isolator.

18 Claims, 3 Drawing Sheets

(56) References Cited

U.S. PATENT DOCUMENTS

| | | |
|---|---|---|
| 2006/0180417 A1 | 8/2006 | Ruebsamen et al. |
| 2006/0243549 A1* | 11/2006 | Young .......................... 188/267 |
| 2007/0039791 A1 | 2/2007 | Krefeld |
| 2007/0131830 A1 | 6/2007 | Brennan et al. |
| 2009/0020381 A1 | 1/2009 | Hindle et al. |
| 2009/0236192 A1 | 9/2009 | Takeuchi |
| 2011/0148236 A1 | 6/2011 | Gates et al. |
| 2012/0061893 A1 | 3/2012 | Hochberg et al. |

OTHER PUBLICATIONS

EP Extended Search Report for Application No. 14171422.0 dated Oct. 8, 2014.

* cited by examiner

ISOLATORS INCLUDING MAGNETICALLY-ASSISTED THERMAL COMPENSATION DEVICES

TECHNICAL FIELD

The present invention relates generally to isolators and, more particularly, to isolators including magnetically-asserted thermal compensation devices, which are highly tunable and capable of providing improved damping fluid pressure profiles over relatively broad temperature ranges.

BACKGROUND

Multi-parameter isolators are often equipped with damper assemblies, which include opposing hydraulic chambers containing a damping fluid. As the operative temperature of the multi-parameter isolator changes, so too does the volume of the damping fluid contained within the damper assembly; the term "operative temperature," as appearing herein, denoting the temperature of the damping fluid or, more generally, the isolator when deployed in field and not necessarily when the isolator is active. In instances wherein the multi-parameter isolator is exposed to significant temperature changes, as may occur when the isolator is included within a spacecraft isolation system or deployed onboard a high altitude airborne platform, relatively pronounced fluctuations in damping fluid volume may occur. Under high temperature operating conditions, the pressure within the hydraulic chambers of the damper assembly may become undesirably high if accommodations are not provided for damping fluid expansion. Such undesirably high pressures may result in buckling of any internally-pressurized bellows included within the damper assembly, undesirably high mechanical stress applied to the bellows and other damper assembly components, and potential leakage of the damping fluid. Conversely, under low temperature operating conditions, the pressure within the damper assembly may become undesirably depressed and cavitation may occur if means are not provided to compensate for the decrease in damping fluid volume.

To help regulate the fluid pressure within a damper assembly and thereby mitigate the above-described issues, multi-parameter isolators subject to broad operative temperature ranges are often further equipped with a thermal compensation device or, more simply, a Thermal Compensator ("TC"). By common design, a TC includes a variable-volume chamber, which is fluidly coupled to the hydraulic chambers of the damper assembly. The variable-volume chamber may be defined, in part, by a TC piston and a TC bellows, which is sealingly joined to the TC piston. The bellows is inherently resilient and urges the TC piston toward an extended position corresponding to the free length position of the bellows. In some implementations, a coil spring may also be provided to exert an additional preload force urging the TC piston toward the extended position. As the pressure of the damping fluid within the damper assembly increases, the force exerted on the face of the TC piston by the damping fluid eventually exceeds the bias force of the bellows and the TC preload spring (if provided). In response, the TC piston moves toward a retracted position, and the bellows compresses. This results in an increase in the volume of the TC chamber to help offset the damping fluid expansion and maintain the damping fluid pressure below a maximum threshold value. Conversely, when the pressure within the damper assembly decreases, the force exerted on the TC piston by the damping fluid is eventually surpassed by the bias force exerted on the piston by the TC bellows and the TC preload spring. The TC piston thus moves toward its extended position, and the bellows expands. This reduces the volume of the TC chamber to partially compensate for the decrease in damping fluid volume and preventing the damping fluid pressure from falling below above below a minimum threshold value.

BRIEF SUMMARY

Embodiments of isolators including magnetically-assisted thermal compensation devices are provided. In one embodiment, the isolator includes a damper assembly and a magnetically-assisted thermal compensator ("TC"). The magnetically-assisted TC includes, in turn, a TC chamber fluidly coupled to the damper assembly and configured to exchange damping fluid therewith. A TC piston is slidably disposed within the TC chamber and exposed to damping fluid when the TC chamber is filled therewith. A TC bellows is sealingly coupled to the TC piston and exerts a resilient bias force thereon. A magnetic preload system is further coupled to the TC piston and exerts a magnetic bias force on the TC piston, which combines with the resilient bias force provided by the TC bellows to impart the magnetically-assisted TC with a predetermined pressure profile over the operative temperature range of the isolator.

Further provided are embodiments of a magnetically-assisted TC utilized in conjunction with a fluid-containing device, such as a fluid-filled damper assembly included within a multi-parameter isolator. In one embodiment, the magnetically-assisted TC includes a TC chamber fluidly coupled to the damper assembly and configured to be filled with a damping fluid; a TC piston slidably disposed within the TC chamber and exposed to damping fluid when the TC chamber is filled therewith; and a TC bellows sealingly coupled to the TC piston and exerting a resilient bias force thereon. A magnetic preload system is coupled to the TC piston and is configured to exert a magnetic bias force thereon, which combines with the resilient bias force provided by the TC bellows to impart the magnetically-assisted TC with a predetermined pressure profile for a given operative temperature range.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

As described in the foregoing section entitled "BACKGROUND," multi-parameter isolators are often equipped with Thermal Compensators or "TCs" to help regulate thermally-induced fluctuations in damping fluid volume. By common design, a TC has a generally linear pressure profile having a positive or progressive slope; the term "pressure profile" referring to the curve or characteristic of the thermal compensator as graphically expressed for damping fluid pressure versus damping fluid temperature for an operative temperature range of the TC or isolator. The pressure profile of a thermal compensator can also be expressed as damping fluid pressure versus other parameters related to damping fluid pressure, such as damping fluid volume, TC piston stroke, or TC bellows compression.

The pressure profile of a conventional TC is largely, if not wholly determined, by the spring rate of the TC bellows and any additional preload spring acting on the TC piston in series with the bellows. As a result, the generally linear pressure profile of a conventional TC is typically characterized by a relatively steep slope and, thus, resembles the force-versus-deflection profile of a Hookean spring. Due to this pressure profile, a conventional TC may permit an undesirably large variance in damping fluid pressure over broader temperature ranges. This is a significant disadvantage. The pressure profile of the TC is typically tuned to ensure that the damping fluid pressure at lower temperatures does not fall below a minimum threshold beneath which cavitation can occur. As a corollary, the TC will thus also permit undesirably high pressures to occur at higher operative temperatures. As described above, allowing such high damping fluid pressures to occur within the TC and the damper assembly increases the mechanical stress applied to the bellows and other damper assembly components. Additionally, the occurrence of high damping fluid pressures within the damper assembly may also place undesired constraints on the damper assembly design; e.g., high damping fluid pressures may exclude the inclusion of internally-pressurized bellows in the damper assembly design and, instead, require the usage of externally-pressurized bellows resistant to buckling under high pressure conditions. As a still further limitation (albeit generally unassociated with the pressure profile), in certain conventional TC designs, the TC includes a preload spring located within a load path of the isolator. When so located, the TC preload spring creates an undesired shunting effect around the intended load path of the isolator, which may negatively impact the overall stiffness properties of the isolator.

The following provides embodiments of isolators including magnetically-assisted TCs that overcome above-described limitations associated with conventional TCs. Embodiments of the below-described magnetically-assisted TC includes a hermetically-sealed TC bellows, which expands and compresses to accommodate fluctuations in damping fluid volume. The inherent stiffness of the TC bellows provides a portion of the desired preload exerted on the TC piston. The remaining portion of TC piston preload is further provided by a magnetic preload system. In particular, the magnetic preload system may includes one or more permanent magnets, which provide a magnetic bias force complementary of the resilient bias force provided by the TC bellows; e.g., the magnetic preload system includes two permanent magnets, which are positioned such that attractive or repellant forces between the magnets provide an additional preload force, as described below. While the following will primarily describe the magnetically-assisted TC as including one or more permanent magnets, the possibility that the magnetically-assisted TC may include one or more electromagnets in place of one or more of the below-described permanent magnets is by no means excluded. Additionally, the term "permanent magnet" is utilized to denote a body or assembly that retains its magnetic properties in the absence of an externally-generated magnetic field and encompasses magnetic assemblies including pole pieces and/or magnetized housings.

Advantageously, embodiments of the magnetically-assisted TC described below provide improved damping fluid pressure profiles over relatively broad temperature ranges. The pressure profile of the magnetically-assisted TC is improved in the sense that the increase in damping fluid pressure with rising damping fluid temperature can be minimize, if not eliminated, over the operative temperature range of the TC. This is accomplished by leveraging the non-linear nature of magnetic interaction forces between the magnets included within the magnetic preload system (or between one magnet and a ferromagnetic surface) to effectively decrease the average slope of the pressure profile of the TC over its operative temperature range. In so doing, the magnetically-assisted TC allows for lower maximum operating pressures and minimum pressure differentials across the operational temperature range of the TC and, therefore, of the multi-parameter isolator, as a whole. Additionally, embodiments of the below-described magnetically-assisted TC are readily tunable by, for example, selecting permanent magnets having differing properties (e.g., size, geometry, composition, strength or grade, etc.) and/or by adjusting gap width between neighboring magnets (or between one permanent magnet and a ferromagnetic surface to which the magnet is attracted). As a still further advantage, embodiments of the magnetically-assisted TC position the magnetic preload system outside of the isolator load path to avoid undesired shunting of the vibratory forces dampened by the isolator.

Figure 1:
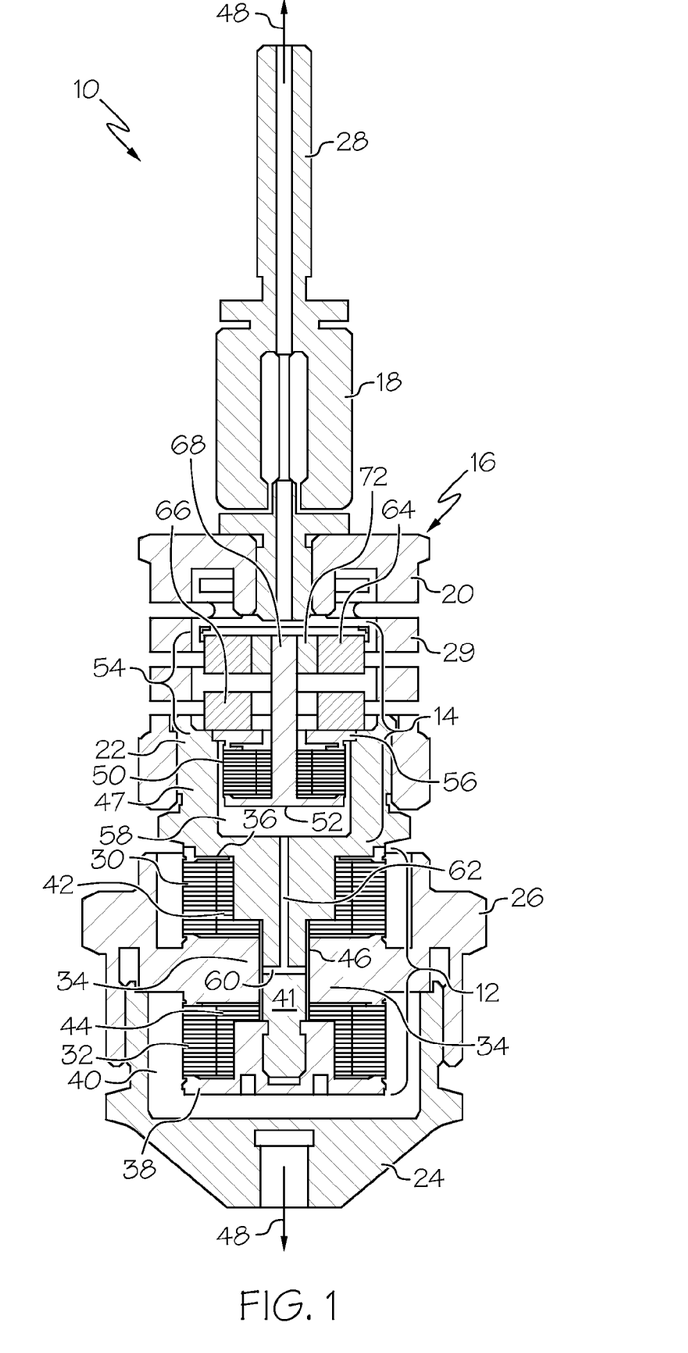
FIG. 1 is a cross-sectional view of a multi-parameter isolator including a magnetically-assisted thermal compensation device or "thermal compensator," as illustrated in accordance with an exemplary embodiment of the present invention.

FIG. 1 is a cross-sectional view of an exemplary embodiment of a multi-parameter isolator 10 including a damper assembly 12 and a magnetically-assisted TC 14, as illustrated in accordance with an exemplary embodiment of the present invention. In this case, isolator 10 is a three parameter device that behaves, at least in part, as a primary spring coupled in parallel with a series-coupled secondary spring and damper assembly. It will also be noted that isolator 10 is a single degree-of-freedom (axially-damping) device well-suited for usage in a multi-point mounting arrangement; e.g., isolator 10 can be combined with a number of like isolators in, for example, a hexapod or octopod-type mounting arrangement to provide high fidelity damping in six degrees of freedom. Such multi-point mounting arrangements are usefully employed in spacecraft isolation systems utilized to attenuate vibrations or impact forces transmitted between a spacecraft and a payload carried by the spacecraft. The instant example notwithstanding, it is emphasized that embodiments magnetically-assisted TC 14 can be integrated into various other types of multi-parameter isolators, such as three parameter isolators providing isolation in multiple degrees-of-freedom and two parameter isolators (e.g., tuned-mass dampers); and can be utilized within terrestrial, waterborne, airborne, and spaceborne applications. Generally, then, magnetically-assisted TC 14 can be utilized in conjunction with any damper assembly or other fluid-containing device to achieve the benefits described herein.

Multi-parameter isolator 10 includes a main isolator housing 16. Main isolator housing 16 can be assembled from any number of discrete components suitable for supporting damper assembly 12 and magnetically-assisted TC 14, while allowing fluid communication therebetween. In the exemplary embodiment shown in FIG. 1, isolator housing 16 includes four primary components (moving from top to bottom): (i) upper end piece 18, (ii) a generally tubular intermediate piece 20, (iii) a goblet-shaped intermediate piece 22, and (iv) a lower end piece 24. Terms such as "upper," "lower," "uppermost," and similar terms are used herein to provide a convenient frame of reference with respect to the illustrated orientation of isolator 10 shown in FIG. 1. It will be appreciated, however, that the illustrated orientation is largely arbitrary and that isolator 10 may assume any orientation in three dimensional space. Each of the components included within isolator housing 16 are described, in turn, below.

As shown in FIG. 1, the lower end of upper end piece 18 is joined to tubular intermediate piece 20 by, for example, welding or threaded attachment. The lower end of tubular intermediate piece 20 is, in turn, joined to (e.g., welded to or threaded onto) the upper end of goblet-shaped intermediate piece 22. By virtue of this construction, housing pieces 18, 20, and 22 are rigidly or fixedly joined together and collectively form an upper housing assembly 18, 20, 22. Notably, upper housing assembly 18, 20, 22 is coupled to lower end piece 24 through damper assembly 12 and, specifically, through the axially-compliant bellows of damper assembly 12 (e.g., opposing bellows 30 and 32, described below). Consequently, upper housing assembly 18, 20, 22 can move axially with respect to lower end piece 24 along the working axis of multi-parameter isolator 10, which is represented in FIG. 1 by dashed line 48. To connect lower end piece 24 of isolator housing 16 to damper assembly 12, the piston of damper assembly 12 (e.g., damper piston 34, described below) may be clamped between the upper inner circumferential edge of lower end piece 24 and the lower circumferential edge of an annular collar piece 26, which is threaded onto lower end piece 24 as generally shown in FIG. 1.

When multi-parameter isolator 10 is installed within an isolation system, the opposing ends of isolator 10 (i.e., upper end piece 18 and lower end piece 24) may be attached to the bodies, structures, or devices between which it is desired to reduce the transmission of disturbance forces. Any suitable attachment hardware (e.g., brackets and fasteners) or other attachment means (e.g., welding, soldering, or bonding) may be utilized to provide the desired connections. In certain implementations, upper end piece 18 may be attached to palette or bench supporting a vibration-sensitive payload (e.g., an optical payload) or a vibration-generating payload (e.g., an array of control moment gyroscopes, reaction wheels, or other attitude adjustment devices), while lower end piece 24 is mounted to a spacecraft, an aircraft, or other platform carrying the payload. Alternatively, this mounting arrangement may be inverted such that upper end piece 18 is mounted to the platform, while lower end piece 24 is attached to the payload. To accommodate minor misalignment in mounting, upper end piece 18 may be fabricated to include an axial extension 28 having a number of cutouts or regions of reduced thickness, which serve as compliant flexure points. Additional cutouts may also be formed in tubular intermediate piece 20 (e.g., by laser cutting) to define a machined compression spring 29, which is coupled in series with damper assembly 12 to enable additional tuning of multi-parameter isolator 10.

Damper assembly 12 includes a first bellows 30, a second bellows 32, and a damper piston 34. Bellows 30 and 32 are sealingly joined to opposing faces of damper piston 34 to allow relative movement between upper housing assembly 18, 20, 22 and piston 34 (and, therefore, lower end piece 24 and collar 26 of isolator housing 16). As shown in FIG. 1, the lower circumferential edge of upper bellows 30 may be sealingly joined to the upper face of damper piston 34; while the upper circumferential edge of lower bellows 32 may be sealingly joined to the opposing, lower face of damper piston 34. The upper circumferential edge of upper bellows 30 may further be sealingly joined to a lower annular ledge 36 provided on intermediate housing piece 22 proximate magnetically-assisted TC 14. Finally, the lower circumferential edge of lower bellows 32 may be sealingly joined to a lower seal piece or bellows cup 38, which is resiliently suspended within a lower cavity 40 provided in lower end piece 24 of isolator housing 16. The above-listed components can be joined utilizing any coupling technique suitable for forming fluid-tight or hermetic seals. A circumferential bonding or welding technique is preferably employed, however, in embodiments wherein bellows 30 and 32 and the other components of damper assembly 14 are fabricated from high temperature metals or alloys.

Depending upon the particular design of multi-parameter isolator 10, bellows 30 and 32 can be either internally- or externally-pressurized. In the illustrated example shown in FIG. 1, bellows 30 and 32 are internally-pressurized; that is, damping fluid acts on the inner surfaces of bellows 30 and 32 during operation of damper assembly 12. When isolator 10 is fully assembled, bellows 30 and 32 cooperate with damper piston 34, intermediate housing piece 22, and lower bellows cup 38 to define two hermitically-sealed hydraulic chambers 42 and 44 within damper assembly 12. Hydraulic chambers 42 and 44 are fluidly coupled by way of one or more restricted orifices or flow passages, such as an annulus 46. As shown in FIG. 1, annulus 46 may be bound along its outer circumference by the inner annular sidewall of piston 34 and further bound along its inner circumference by an outer circumferential surface of intermediate housing piece 22. In the latter regard, intermediate housing piece 22 may include an axially-elongated rod or stem 41, which extends through a central opening provided in damper piston 34 and which bounds the inner circumference of annulus 46. Isolator 10 may initially be produced and distributed without damping fluid, in which case damper assembly 12 and TC 14 may be filled with a selected damping fluid at a chosen juncture after production and prior to deployment of isolator 10. Filling of damper assembly 12 and TC 14 may be accomplished utilized a non-illustrated fill port, which can be sealed (e.g., via deformation of a copper ball) after filling.

Stem 41 of intermediate housing piece 22 extends axially from the upper cup-shaped body 47 of housing piece 22, through upper bellows 30, through the central opening provided in damper piston 34, and to lower bellows cup 38. At its lower terminal end, stem 41 is fixedly attached to a central post protruding upwardly from lower bellows cup 38. As a result of this structural arrangement, the uppermost portion of isolator 10 (upper housing assembly 18, 20, 22) is mechanically connected to lower end piece 24 through damper assembly 12. Thus, as briefly mentioned above, lower end piece 24, collar 26, and damper piston 34 can translate with respect to upper housing assembly 18, 20, 22 along the working axis 48 of isolator 10. Bellows 30 and 32 expand and compress, as needed, to accommodate such relative axial movement between the upper and lower portions of isolator 10. As bellows 30 and 32 expand and contract, damper piston 34 strokes upward and downward (considered relative to upper housing assembly 18, 20, 22), and damping fluid is forced through restricted annulus 46. The flow of damping fluid through annulus 46, and the resulting viscous losses, provide the desired damping effect by dissipating the kinetic energy transmitted through isolator 10.

Magnetically-assisted TC 14 can be integrated into various different regions of isolator 10. In the exemplary embodiment illustrated in FIG. 1, TC 14 is position axially adjacent damper assembly 12 between damper assembly 12 and end piece 18. More specifically, magnetically-assisted TC 14 is nested within the internal cavities provided within tubular housing piece 20 and the upper cup-shaped body 47 of intermediate housing piece 22. In the illustrated example, magnetically-assisted TC 14 includes three main components, namely, (i) a TC bellows 50, (ii) a TC piston 52, and (iii) a magnetic preload system 54. However, the possibility that TC 14 may include additional components, such as a TC preload spring, is by no means excluded. In the illustrated example, TC bellows 50 is externally-pressurized; however, TC bellows 50 may be internally pressurized in other embodiments. The upper circumferential edge of TC bellows 50 is welded, bonded, or otherwise sealingly joined to the lower face of an annular seal piece or bellows cap 56 further included within TC 14. The outer circumferential edge of bellows cap 56 is, in turn, sealingly joined to an upper circumferential ledge provided on intermediate housing piece 22. Finally, the lower circumferential edge of bellows 50 is welded, bonded, or otherwise sealingly joined to TC piston 52. As a result of this structural configuration, TC piston 52 is resiliently suspended within damper assembly 14 and can translate along an axis, which may be substantially parallel with or co-axial with the working axis 48 of isolator 10.

Collectively, the interior surfaces of TC bellows 50, TC piston 52, and bellows cap 56 define a variable-volume TC chamber 58 within TC 14. As TC piston 52 moves, TC bellows 50 compresses and expands, and the volume of TC chamber 58 changes. When TC piston 52 is in the first position extreme shown in FIG. 1 (referred to herein as the "extended position"), TC bellows 50 resides its expanded or free length position and the volume of TC chamber 58 is relatively small. Conversely, when TC piston 52 moves toward the opposing, second positional extreme (referred to herein as the "retracted position" and corresponding to upward movement of piston 52 in the illustrated orientation), TC bellows 50 compresses towards its solid height position and the volume of TC chamber 58 increases. TC bellows 50 imparts a resilient bias force on TC piston 52 urging movement of piston 52 toward the extended position shown in FIG. 1. Notably, magnetic preload system 54 also exerts a bias force that likewise urges movement of TC piston 52 toward the extended position. The magnetic bias force exerted on TC piston 52 by magnetic preload system 54 combines with the resilient bias force inherently provided by TC bellows 50 to impart TC 14 with an optimal damping fluid pressure profile, as described more fully below in conjunction with FIGS. 2 and 3.

Variable-volume TC chamber 58 is fluidly coupled to opposing hydraulic chambers 42 and 44 of damper assembly 12 so as to allow the exchange of damping fluid. In this regard, at least one flow passage may be provided through axially-elongated stem 41 of intermediate housing piece 22 to allow fluid communication between TC chamber 58 of TC 14 and hydraulic chambers 42 and 44 of damper assembly 12. For example, as shown in FIG. 1, a number of cross-bores 60 may be drilled into or otherwise formed in stem 41 proximate annulus 46; and a central, axially-elongated flow passage 62 may be further drilled or otherwise formed in stem 41. Flow passage 62 extends axially within intermediate housing piece 22 from cross-bores 60 to the floor of variable-volume TC chamber 58. In this manner, flow passage 62 and cross-bores 60 cooperate to permit the exchange of damping fluid damper assembly 12 and magnetically-assisted TC 14.

As do thermal compensation devices generally, magnetically-assisted TC 14 accommodates variations in damping fluid volume across a range of temperatures to help regulate the pressure within hydraulic chambers 42 and 44 of damper assembly 12. A brief description of the operation of TC 14 will be provided at this juncture to establish a general context in which the more detailed description of magnetic preload system 54 appearing below can be better understood. Consider first the operation of magnetically-assisted TC 14 under elevated operating conditions during which the damping fluid expands. When the force exerted on the effective areas of TC piston 52 and bellows 50 by the expanding damping fluid exceeds the cumulative bias force exerted on TC piston 52 by the resilient preload force of TC bellows 50 and the magnetic preload force of magnetic preload system 54, TC piston 52 will move away from damper assembly 12 along axis 48 (that is, upward toward the fully retracted position) and TC bellows 50 will compress. The volume of TC chamber 58 will consequently increase to minimize the increase in damping fluid pressure within hydraulic chambers 42 and 44 of damper assembly 12. Conversely, under low temperature operating conditions during which the damping fluid volume is reduced, the pressure exerted on the effective areas of TC bellows 50 and TC piston 52 decreases. In response, TC piston 52 will move toward damper assembly 12 along axis 48 (that is, downward toward the fully extended position shown in FIG. 1) and TC bellows 50 will expand. The volume of TC chamber 58 is reduced according to prevent the fluid pressure within damper assembly 12 from becoming undesirably low.

Figure 2:
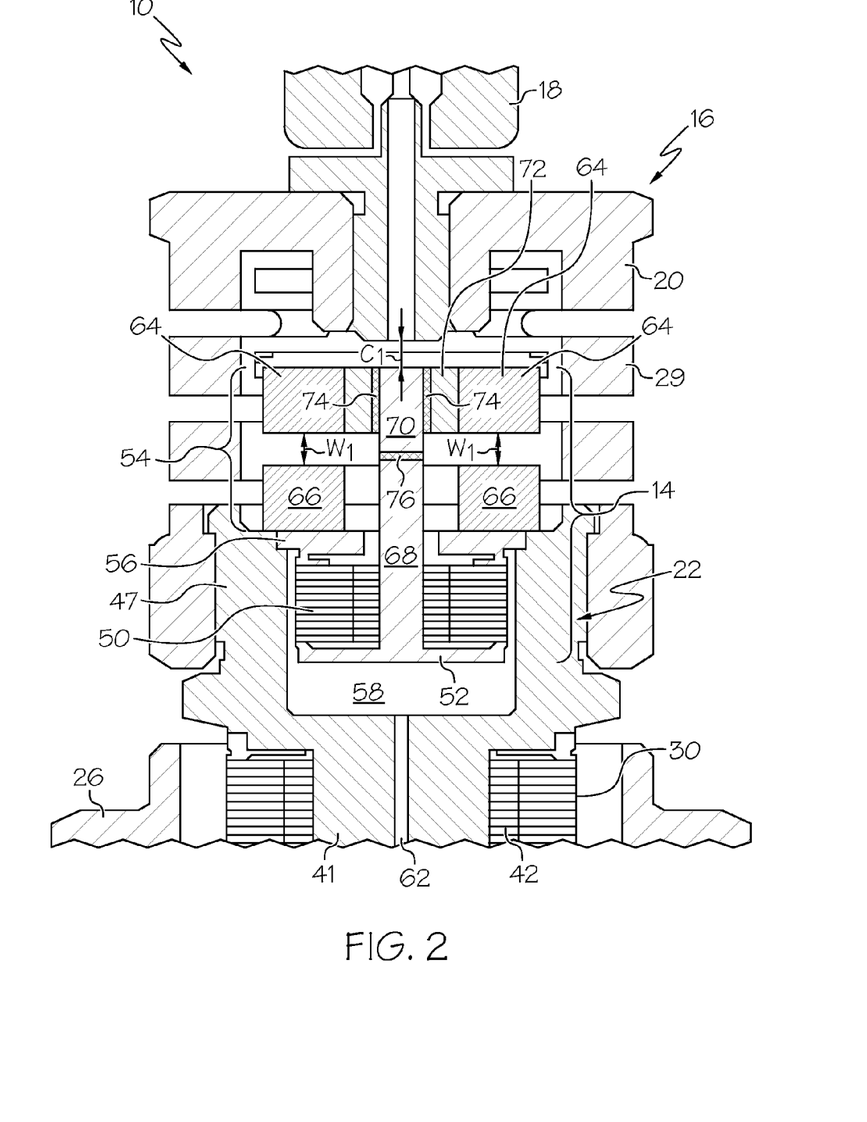
FIG. 2 is a cross-sectional view of a portion of the multi-parameter isolator shown in FIG. 1 illustrating the magnetically-assisted thermal compensator in greater detail.

FIG. 2 is a cross-sectional view of a portion of multi-parameter isolator 10 illustrating magnetically-assisted TC 14 and, specifically, magnetic preload system 54 in greater detail. It can be seen in FIG. 2 that magnetic preload system 54 includes a first or upper permanent magnet 64 and a second or lower permanent magnet 66. Lower permanent magnet 66 is adhered to or otherwise affixed to isolator housing 16 and, specifically, to bellows cap 56 opposite TC bellows 50. In contrast, upper permanent magnet 64 is fixedly coupled to TC piston 52 and moves in conjunction therewith along working axis 48 (identified in FIG. 1). In the illustrated example, this mechanical coupling is formed by mounting permanent magnet 64 to an elongated stem or piston post 68, which projects axially from TC piston 52, through externally-pressurized bellows 50, through bellows cap 56, and to an area above TC chamber 58. Permanent magnet 64 is mounted to the upper terminal end 70 of piston post 68 utilizing an attachment 72. Attachment 72 is preferably composed of a non-ferromagnetic material. In one embodiment, attachment 72 is a body of epoxy bonding upper magnet 64 to the upper terminal end of the axially-elongated piston post 68. In a second embodiment, attachment 72 is a threaded insert adhered to magnet 64 and threaded onto the upper terminal end of post 68. In implementations wherein permanent magnet 64 is a ring magnet, permanent magnet 64 may circumscribe the terminal end 70 of piston post 68 and attachment 72 may be disposed therebetween, as generally shown in FIG. 2.

Permanent magnets 64 and 66 may be positioned in any spatial relationship suitable for magnetically interacting such that a bias or preload force is created urging TC piston 52 toward a particular position, such as the extended position shown in FIGS. 1 and 2. In the illustrated example, permanent magnet 64 is positioned for magnetic attraction to permanent magnet 66; that is, magnets 64 and 66 are positioned with opposite poles facing one another and in sufficient proximity to create a magnetic bias of a desired magnitude. When TC piston 52 resides in the extended position (FIGS. 1 and 2), permanent magnets 64 and 66 are separated by an axial gap having a predetermined width (identified in FIG. 2 as "W1"). The attraction of permanent magnet 64 toward permanent magnet 66 creates a magnetic preload force, which is transmitted to TC piston 52 through piston post 68 urging piston toward the extended position. As the fluid pressure within TC chamber 58 increases to a level sufficient to cause the retraction of TC piston 52 (that is, upward movement of piston 52 in the orientation shown in FIGS. 1 and 2), the width of the axial gap separating magnets 64 and 66 increases. As a result, the magnetic bias force exerted on TC piston 52 by magnetic preload system 54 decreases rapidly, as graphically expressed in FIG. 3 (described below). At the same time, the resilient bias force exerted on TC piston 52 by TC bellows 50 urging piston 52 toward the extended position (FIG. 1) increases, as also graphically expressed in FIG. 3. An axial clearance $C_1$ is provided between terminal end 70 of piston post 68 and the neighboring inner wall of isolator housing 16 to accommodate the upward movement of piston post 68 and magnet 66 as TC piston 52 retracts.

Any type of magnet capable of providing the desired preload force can be used for magnets 64 and 66. While composite magnets (e.g., ceramic magnets, ferrite magnets, aluminum-nickel-cobalt magnets, etc.) and polymer-bonded magnets (e.g., injection molded and flexible magnets) are by no means excluded from usage, it is generally preferred that a rare earth magnet, such as a neodymium or samarium cobalt magnet, is selected for use as magnets 64 and 66. Relative to samarium cobalt magnets, neodymium magnets tend to be less costly, to have higher magnetic strengths, and to be less prone to fracture; thus, in many applications, neodymium magnets will be preferred over samarium cobalt magnets. However, in embodiments wherein magnets 64 and 66 are exposed to significantly elevated temperatures, samarium cobalt magnets may be preferred. Magnets 64 and 66 can be imparted with various different geometries; e.g., magnets 64 and 66 may comprise ring magnets as shown in FIGS. 1 and 2 or, instead, may assume other forms in alternative embodiments, such as that of a block or disk magnet. Additionally, embodiments of magnetic preload system 54 can be produced wherein magnets 64 and 66 are separated by a radial rather than an axial gap. In this case, magnets 64 and 66 may be disposed in a side-by-side relationship when TC piston 52 resides in the extended position, and may be displaced therefrom as TC piston 52 retracts to provide the desired bias force. Finally, it will also be noted that permanent magnets 64 and 66 can be positioned in a various different locations or regions of magnetically-assisted TC 14, while still providing the desired magnetic preload force. For example, in further embodiments, permanent magnets 64 and 66 could be mounted within bellows 50 or, instead, disposed within TC chamber 58.

While magnetic preload system 54 includes two permanent magnets in the illustrated example, this need not always be the case. In certain embodiments, magnetic preload system 54 may include three or more magnets, which may be disposed in various different spatial arrangements to provide the desired magnetic preload force. Furthermore, in certain embodiments, magnetic preload system 54 may include a single magnet in certain embodiments, which is positioned in sufficient proximity of a ferromagnetic surface for magnetic attraction thereto. For example, in a modified version of the embodiment shown in FIGS. 1 and 2, lower magnet 66 could potentially be eliminated if bellows cap 56 were fabricated from a ferromagnetic metal, upper magnet 64 were positioned sufficiently close to bellows cap 56, and upper magnet 64 were imparted with a sufficient pull force (and/or bellows cap 56 were imparted with a sufficient thickness) to provide the desired magnetic preload force.

Magnetic preload system 54 is highly tunable. For example, magnetic preload system 54 can be tuned on a design level by selecting magnets 64 and 66 to have separate properties, such as different shapes, geometries, compositions, strengths or grades, directions of magnetization, and so on. The relative position of magnets 64 and 66 can also be adjusted to increase or decrease the magnetic bias force, as might be desired. In this latter regard, magnetic preload system 54 can be designed to allow manual adjustment of the gap width $W_1$ (FIG. 2) between permanent magnets 64 and 66 by, for example, providing a threaded interface at a location between magnet 64 and TC piston 52. For example, as generically indicated in FIG. 2 by cross-hatched areas 74, a threaded interface can be provided between terminal end 70 of piston post 68 and attachment 72 (in which case attachment 72 may assume the form of a threaded insert bonded to magnet 64 utilizing an epoxy or other adhesive, as described above). Alternatively, as indicated in FIG. 2 by cross-hatched area 76, piston post 68 may comprise two sections that are threadably joined. In this case, terminal end 70 of piston post 68 can be turned utilizing an Allen wrench or similar to tool to increase or decrease the length of post 68 to increase or decrease, respectively, the width $W_1$ of the axial gap separating magnets 64 and 66 and thereby fine tune the magnetic preload force provided by system 54. It will also be noted that magnets 64 and 66 are positioned outside of the load path of isolator 10, which extends through intermediate housing 20 (including machined spring 29), around magnetic preload system 54, and to damper assembly 12 (FIG. 1).

Figure 3:
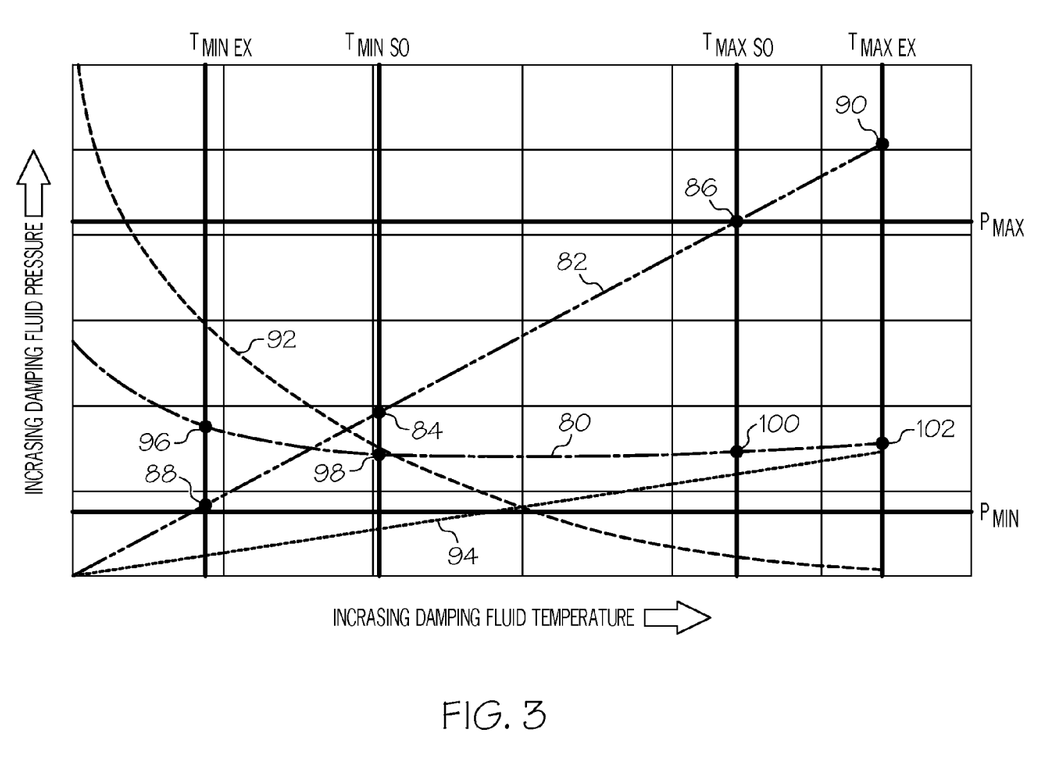
FIG. 3 is a graph of damping fluid pressure (vertical axis) versus damping fluid temperature (horizontal axis) illustrating the pressure profile of the magnetically-assisted thermal compensator shown in FIGS. 1 and 2 as compared to the pressure profile of a conventional, solely spring-biased thermal compensation device.

FIG. 3 is a graph of damping fluid pressure (vertical axis) versus damping fluid temperature (horizontal axis) illustrating the pressure profile magnetically-assisted TC 14 (FIGS. 1 and 2) as compared to the pressure profile of a conventional, solely spring-biased thermal compensation device, in a non-limiting example. Here, the pressure profile of magnetically-assisted TC 14 is represented by trace 80, while the pressure profile of the conventional TC is represented by trace 82. As can be seen in FIG. 3, the pressure profile of the conventional TC (trace 82) is generally characterized by a straight line having a relatively moderate to steep slope. The conventional TC (trace 80) thus provides a relatively low damping fluid pressure (identified in FIG. 3 by marker 84) at the minimum operating temperature occurring under normal or standard operating conditions of the damper assembly or isolator (identified in FIG. 3 by the vertical line labeled "$T_{MIN\ SO}$"). Conversely, the conventional TC (trace 80) provides a relatively high damping fluid pressure (identified in FIG. 3 by marker 86) at the maximum operating temperature under standard operating conditions (identified by the vertical line labeled "$T_{MAX\ SO}$"). The high damping fluid pressure provide by the conventional TC (trace 80) may approach the maximum threshold pressure of the damper assembly (identified in FIG. 3 by the horizontal line labeled "$P_{MAX}$"). Should the damping fluid pressure exceed the maximum pressure threshold ($P_{MAX}$), undesired amount of stress may be applied to the bellows and other components of the TC and isolator reducing the operational lifespan of these components and potentially resulting in damping fluid leakage.

It should thus be appreciated from the foregoing description of the pressure profile provided by the conventional TC (trace 80) in FIG. 3 provides a significant pressure differential between the minimum and maximum temperatures occurring under standard operating conditions ($T_{MIN\ SO}$ and $T_{MAX\ SO}$, respectively). This pressure differential is even more pronounced when considering extreme operating conditions, which may occur when the damping fluid temperature becomes unusually low (e.g., due to unusually low ambient temperatures) or becomes abnormally high (e.g., due unusually high ambient temperatures, the occurrence of a solar flare, the dissipation of large amounts of kinetic energy if the isolator should remain active during spacecraft launch, and so on). Such extreme operating conditions are further graphically represented in FIG. 3 over temperature range $T_{MIN\ EX}$ to $T_{MAX\ EX}$. At the minimum operating temperature occurring under extreme operating conditions (identified by the vertical line labeled "$T_{MIN\ EX}$"), the conventional TC (trace 80) provides a very low damping fluid pressure (identified by marker 88). This low damping fluid pressure may approach the minimum threshold pressure below which cavitation may occur (identified in FIG. 3 by the horizontal line labeled "$P_{MIN}$"). Conversely, at the maximum operating temperature occurring under extreme operating conditions (identified by the vertical line labeled "$T_{MAX\ EX}$"), the conventional TC (trace 80) permits the damping fluid pressure to reach a highly elevated level (identified in FIG. 3 by marker 90). As indicated in FIG. 3, this high damping fluid pressure may surpass the maximum threshold pressure ($P_{MAX}$) and result in undesirable mechanical stress and potential damping fluid leakage, as previously described.

Turning now to the damping profile of magnetically-assisted TC 14, it can be seen in FIG. 3 the trace 82 has an average slope that is considerably less than slope of the damping profile of the conventional TC (trace 80), whether considered over the standard operational temperature range ($T_{MIN\ SO}$ to $T_{MAX\ SO}$) or considered over the extreme operational temperature rang ($T_{MIN\ EX}$ to $T_{MAX\ EX}$). Indeed, the average slope of the damping profile of TC 14 (trace 80) may be approach a zero value (flat slope). As described above, the damping profile of TC 14 (trace 82) is a product of the magnetic bias force provided by magnetic preload system 54 (FIGS. 1 and 2) and the resilient preload force provide by TC bellows 50 (FIGS. 1 and 2). This may be appreciated in FIG. 3 wherein the magnetic bias force provided by magnetic preload system 54 is represented by dashed line 92, which decreases rapidly with increasing damping fluid temperature (due to the increasing displacement of TC piston 52 from the extended position and the increasing gap width $W_1$ between permanent magnets 64 and 66 shown in FIGS. 1 and 2). By comparison, the resilient preload force provided by bellows 50 is represented by dashed line 94, which increases gradually with increasing damping fluid pressure (due to the increasing displacement of TC piston 52 from the extended position and the corresponding compression of bellows 50). The increase in the resilient/spring bias force provided by TC bellows 50 is thus partially compensates for the decrease in the magnetic preload force provided by magnetic preload system 54 to produce the relatively flat damping pressure profile of magnetically-assisted TC 14 shown in FIG. 3.

Due to the relatively flat damping pressure profile of magnetically-assisted TC 14, TC 14 (trace 80) is able to provide a relatively high operating pressure at the minimum pressure occurring under extreme operating conditions ($T_{MAX\ SO}$; marker 96) and at the minimum pressure occurring under standard operating conditions ($T_{MIN\ SO}$; maker 98). Additionally, magnetically-assisted TC 14 (trace 80) provides a relatively low operating pressure at the maximum pressure occurring under standard operating conditions ($T_{MIN\ EX}$; marker 100) and at the maximum pressure occurring under extreme operating conditions ($T_{MAX\ EX}$; maker 102). Indeed, as shown in FIG. 3, the operating pressure provided by magnetically-assisted TC 14 (trace 80) under minimum and maximum operating temperatures during standard operation (markers 98 and 100) may differ by less than 10% and, more preferably, by less than 5%; and the operating pressure provided by magnetically-assisted TC 14 at the maximum operating temperature under extreme operating conditions (marker 102) may be less than operating pressure provided by TC 14 at the minimum operating temperature under extreme operating conditions (marker 96). In all scenarios, the operating pressure provided by the magnetically-assisted TC 14 remains between pre-established minimum and maximum pressure thresholds ($P_{MIN}$ and $P_{MAX}$, respectively). As a result, cavitation is avoided; and mechanical to bellows 30 and 32 and other the components of damper assembly 12 is reduced. Overall, magnetically-assisted TC 14 (FIGS. 1 and 2) allows for lower maximum operating pressures and minimum pressure differentials across the operational temperature range of damper assembly 12 and multi-parameter isolator 10 thereby enhances the temperature capabilities of isolator 10.

The foregoing has thus provided embodiments of an isolator including a magnetically-assisted thermal compensator, which provides improved damping fluid pressure profiles over relatively broad temperature ranges. Notably, the above-described magnetically-assisted TC allows for lower maximum operating pressures and minimum pressure differentials across the operational temperature range of the TC and, therefore, of the isolator into which the TC is integrated. As a further advantage, embodiments of the above-described magnetically-assisted TC are readily tunable both by initial design and by manual adjustments. As a still further advantage, embodiments of the magnetically-assisted TC locate the magnetic preload system outside of the isolator load path or paths to avoid undesired shunting of the vibratory or impact forces dampened by the isolator.

While described above primarily in the context of a particular type of multi-parameter isolator, namely, an axially-damping, three parameter isolator, additional embodiments of the magnetically-assisted thermal compensator can be utilized with other types of isolators and other types of fluid-containing devices, generally. For example, embodiments of a magnetically-assisted TC have been provided that can be utilized in conjunction with a fluid-containing device. In one embodiment, the magnetically-assisted TC includes: (i) a TC chamber fluidly coupled to the damper assembly and configured to be filled with a damping fluid; (ii) a TC piston slidably disposed within the TC chamber and exposed to damping fluid when the TC chamber is filled therewith; and (iii) a TC bellows sealingly coupled to the TC piston and exerting a resilient bias force thereon; and (iv) a magnetic preload system coupled to the TC piston. The magnetic preload system is configured to exert a magnetic bias force thereon, which combines with the resilient bias force provided by the TC bellows to impart the magnetically-assisted TC with a predetermined pressure profile over a given temperature range. In certain embodiments, the TC bellows exerts a resilient bias force on the TC piston urging the TC piston toward an extended position, while the magnetic preload system exerts a complementary magnetic bias force urging the TC piston toward the extended position. The magnetically-assisted TC may also include a stationary structure coupled to the TC piston via the TC bellows (e.g., isolator housing 16 and bellows cap 56), and the magnetic preload system may further include: (iv)(a) a first permanent magnet fixedly coupled to the TC piston; (iv)(b) a second permanent magnet fixedly coupled to the stationary structure and exerting an attractive force on the first magnet urging the TC piston toward an extended position; and (iv) (c) an air gap (e.g., the axial gap between magnets 64 and 66 in FIGS. 1 and 2) separating the first and second permanent magnet, the width of the air gap increasing as the TC piston moves toward the extended position.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. An isolator having an operative temperature range, the isolator comprising:
   a damper assembly;
   a magnetically-assisted thermal compensator ("TC"), comprising:
   a TC chamber fluidly coupled to the damper assembly and configured to exchange damping fluid therewith;
   a TC piston slidably disposed within the TC chamber and exposed to damping fluid when the TC chamber is filled therewith;
   a TC bellows sealingly coupled to the TC piston and exerting a resilient bias force thereon; and
   a magnetic preload system coupled to the TC piston and configured to exert a magnetic bias force thereon, which combines with the resilient bias force provided by the TC bellows to impart the magnetically-assisted TC with a predetermined pressure profile over the operative temperature range of the isolator; and
   an isolator housing containing the TC chamber;
   wherein magnetic preload system comprises:
   a first permanent magnet coupled to the TC piston and configured to move therewith during operation of the isolator; and
   a second permanent magnet fixedly coupled to the isolator housing.

2. The isolator of claim 1 wherein the TC bellows exerts a resilient bias force on the TC piston urging the TC piston toward an extended position, and wherein the magnetic preload system exerts a complementary magnetic bias force on the TC piston also urging the TC piston toward the extended position.

3. The isolator of claim 1 wherein the magnetically-assisted TC further comprises a stem extending from the TC piston through the TC bellows, the first permanent magnet mounted to the stem.

4. The isolator of claim 3 wherein the magnetic preload system further comprises a non-ferromagnetic attachment affixing the first permanent magnet to an end portion of the stem opposite the TC piston.

5. The isolator of claim 1 wherein the first permanent magnet is positioned so as to be attracted to the second permanent magnet to produce the magnetic bias force urging the TC piston toward the extended position.

6. The isolator of claim 1 wherein the first and second permanent magnets are spaced apart by an axial gap.

7. The isolator of claim 6 wherein the magnetically-assisted TC further comprises a threaded interface enabling the width of the axial gap between the first and second permanent magnets to be adjusted.

8. The isolator of claim 1 further comprising a bellows cap sealingly coupled to the TC bellows, the second permanent magnet mounted to the bellows cap.

9. The isolator of claim 1 wherein the TC piston is movable between a refracted position and an extended position, wherein the TC bellows provides a resilient preload force that increases as the TC piston moves from the extended position toward the retracted position, and wherein the magnetic preload system provides a magnetic bias force that decreases as the TC piston moves from the extended position toward the retracted position.

10. The isolator of claim 1 wherein the isolator has at least one load path therethrough, and wherein the magnetic preload system is positioned outside of the at least one load path.

11. The isolator of claim 1 wherein the isolator is a three parameter isolator.

12. An isolator providing a damping profile having an average slope over an operative temperature range of the isolator, the isolator comprising:
   a damper assembly; and
   a magnetically-assisted thermal compensator ("TC"), comprising:
   a TC piston movable between a first position and a second position;
   a TC bellows sealingly coupled to the TC piston and exerting a resilient bias force thereon urging the TC piston toward the second position, the resilient bias force decreasing as the TC piston moves from the first position toward the second position; and
   a first permanent magnet fixedly coupled to the TC piston and exerting a magnetic bias force thereon urging the TC piston toward the second position, the magnetic bias force increasing as the TC piston moves from the first position toward the second position at least partially compensating for the decreasing resilient bias force such that the average slope of the damping profile is reduced over the operative temperature range of the isolator.

13. The isolator of claim 12 wherein the TC piston and TC bellows define a variable-volume chamber in fluid communication with the damper assembly, and wherein volume of the variable-volume chamber is greater when the TC piston is in the first position than when the TC piston is in the second position.

14. The isolator of claim 12 wherein the isolator further comprises an isolator housing in which the magnetically-assisted TC is disposed, and wherein the magnetically-assisted TC further comprises a second permanent magnet position affixed to the isolator housing at a position whereat the second permanent magnet exerts an attractive force on the first permanent magnet.

15. The isolator of claim 14 wherein the first permanent magnet and the second permanent magnet are separated by an axial gap when the TC piston resides in the first position, and wherein the width of the axial gap increases as the TC piston moves from the first position toward the second position.

16. A magnetically-assisted thermal compensator ("TC") utilized in conjunction with a fluid-containing device, the magnetically-assisted TC comprising:
   a TC chamber configured to be filled with a damping fluid;
   a TC piston slidably disposed within the TC chamber and exposed to damping fluid when the TC chamber is filled therewith;
   a TC bellows sealingly coupled to the TC piston and exerting a resilient bias force thereon; and
   a magnetic preload system coupled to the TC piston and configured to exert a magnetic bias force thereon, which combines with the resilient bias force provided by the TC bellows to impart the magnetically-assisted TC with a predetermined pressure profile over a given temperature range;

wherein the resilient bias force increases while the magnetic bias force decreases when the TC piston moves in a first direction, and wherein the resilient bias force decreases while the magnetic bias force increases when the TC piston moves in a second direction opposite the first direction.

17. The magnetically-assisted TC of claim 16 wherein the TC bellows exerts a resilient bias force on the TC piston urging the TC piston toward an extended position, and wherein the magnetic preload system exerts a complementary magnetic bias force urging the TC piston toward the extended position.

18. The magnetically-assisted TC of claim 16 further comprising a stationary structure coupled to the TC piston via the TC bellows, and wherein magnetic preload system further comprises:

a first permanent magnet fixedly coupled to the TC piston;

a second permanent magnet fixedly coupled to the stationary structure and exerting an attractive force on the first magnet urging the TC piston toward an extended position; and an air gap separating the first and second permanent magnet, the width of the air gap increasing as the TC piston moves toward the extended position.

\* \* \* \* \*